(12) United States Patent
Bito

(10) Patent No.: US 11,148,487 B2
(45) Date of Patent: Oct. 19, 2021

(54) TREAD PATTERN GENERATION METHOD FOR GENERATING TREAD PATTERN OF TIRE TO REDUCE NOISE WITH HIGHER PRECISION

(71) Applicant: TOYO TIRE & RUBBER CO., LTD., Itami (JP)

(72) Inventor: Kensuke Bito, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 439 days.

(21) Appl. No.: 16/183,054

(22) Filed: Nov. 7, 2018

(65) Prior Publication Data

US 2019/0160898 A1 May 30, 2019

(30) Foreign Application Priority Data

Nov. 30, 2017 (JP) .............................. JP2017-230946

(51) Int. Cl.
*B60C 99/00* (2006.01)
*G06F 30/00* (2020.01)
(Continued)

(52) U.S. Cl.
CPC ............ *B60C 99/006* (2013.01); *G06F 30/00* (2020.01); *G06F 30/15* (2020.01);
(Continued)

(58) Field of Classification Search
CPC ... B60C 99/006; B60C 11/0318; G06F 30/00; G06F 30/15; G06F 2111/04; G06F 2119/10
See application file for complete search history.

(56) References Cited

U.S. PATENT DOCUMENTS 5,746,848 A 5/1998 Schulze et al.
2007/0078633 A1 4/2007 Sundkvist et al.
(Continued)

FOREIGN PATENT DOCUMENTS

JP 2007-62731 A 3/2007
JP 4049570 B2 2/2008
(Continued)

OTHER PUBLICATIONS

Office Action dated Aug. 3, 2021, issued in counterpart JP application No. 2017-230946, with English translation. (10 pages).

*Primary Examiner* — Saif A Alhija
(74) *Attorney, Agent, or Firm* — Westerman, Hattori, Daniels & Adrian, LLP

(57) ABSTRACT

A processing device divides an initial tread pattern into multiple mutually adjacent partial patterns, each having a width smaller than that of the initial tread pattern, by at least one straight line along a circumferential direction of a tire. The processing device calculates variation amounts of characteristic values of the partial patterns with respect to the circumferential direction, based on a contact region, each of the characteristic values indicating a shape of a corresponding partial pattern. The processing device modifies the shapes of the partial patterns so as to reduce the variation amounts of the characteristic values of the partial patterns. The processing device relatively moves the partial patterns along the circumferential direction so as to reduce a total variation amount of characteristic values of at least two mutually adjacent partial patterns. The processing device combines the partial patterns with each other to generate a tread pattern of the tire.

6 Claims, 13 Drawing Sheets

(51) Int. Cl.
  *G06F 30/15*   (2020.01)
  *B60C 11/03*   (2006.01)
  *G06F 111/04*  (2020.01)
  *G06F 119/10*  (2020.01)

(52) U.S. Cl.
  CPC ....... *B60C 11/0318* (2013.01); *G06F 2111/04* (2020.01); *G06F 2119/10* (2020.01)

(56) References Cited

U.S. PATENT DOCUMENTS

| | | | |
|---|---|---|---|
| 2008/0093010 A1 | 4/2008 | Stuckey et al. | |
| 2010/0175799 A1* | 7/2010 | Takahashi | B60C 11/032 152/209.3 |
| 2012/0097301 A1* | 4/2012 | Zhu | B60C 99/006 152/209.1 |

FOREIGN PATENT DOCUMENTS

| | | | |
|---|---|---|---|
| JP | 4913418 | B2 | 4/2012 |
| JP | 5123945 | B2 | 1/2013 |
| JP | 5658249 | B2 | 1/2015 |

\* cited by examiner

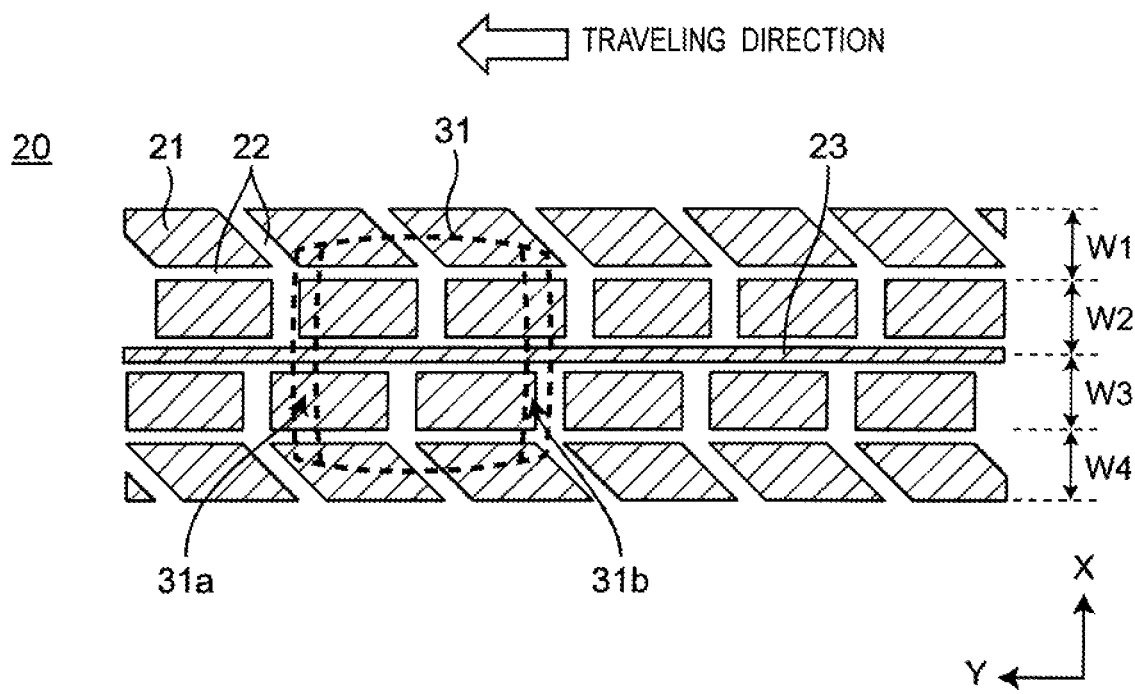

TREAD PATTERN GENERATION METHOD FOR GENERATING TREAD PATTERN OF TIRE TO REDUCE NOISE WITH HIGHER PRECISION

BACKGROUND

1. Technical Field

The present invention relates to a tread pattern generation method and program for generating a tread pattern of a tire, as well as a storage medium storing a program for generating a tread pattern of a tire.

2. Description of Related Art

When a vehicle is traveling, so-called pattern noise, such as pattern striking noise or pumping noise, is produced according to a tread pattern of a tire. The pattern striking noise is a sound produced by vibration of a tire due to an impact force occurring when a region of the tread contacts (impacts) a road surface. The pumping noise is a sound produced by compressing air in a space surrounded by the road surface and a groove of the tread when a region of the tread contacts the road surface, and then, expanding the compressed air when this region leaves the road surface.

In order to evaluate noise produced by a tire, a computer simulation may be performed based on a tread pattern of the tire. For example, by applying the image analysis to a tread pattern, or applying the finite element method to a three-dimensional model of a tire, regions in which the tire contacts a road surface and regions in which the tire does not contact the road surface are identified, and then, variation of a contact area and/or a non-contact area during one revolution of the tire is calculated. From the variation of the contact area and/or the non-contact area, a magnitude of the noise produced by the tire is derived. The variation of the contact area and/or the non-contact area is processed in a time domain or a frequency domain, to evaluate the magnitude of the noise. For example, Japanese Patent Publication No. 4049570, Japanese Patent Publication No. 4913418, Japanese Patent Publication No. 5123945, and Japanese Patent Publication No. 5658249 disclose such simulation methods and the like.

SUMMARY

According to the conventional tire noise simulation, the entire tire has been treated as a single noise source. However, indeed, a plurality of mutually different points in a region in which the tire contacts the road surface (contact region or footprint) may act as a plurality of mutually different noise sources. As a result, in a real tire, the noise may not be reduced to a level expected from simulation result. Therefore, it is required to generate a tread pattern so as to reduce noise with higher precision than that of the prior art.

An object of the present invention is to provide a tread pattern generation method, a tread pattern generation apparatus, and a storage medium storing a program, that are capable of generating a tread pattern so as to reduce noise with higher precision than that of the prior art.

According to a first aspect of the present invention, a tread pattern generation method for generating a tread pattern of a tire by a computer is provided. The method includes a step of reading an initial tread pattern and a contact region from a storage device, the contact region indicating a region in which the tire contacts a road surface. The method includes a step of dividing the initial tread pattern into a plurality of partial patterns in a width direction of the tire. The method includes a step of calculating variation amounts of characteristic values of the partial patterns with respect to a circumferential direction of the tire, based on the contact region, each of the characteristic values indicating a shape of a corresponding partial pattern. The method includes a step of modifying the shapes of the partial patterns so as to reduce the variation amounts of the characteristic values of the partial patterns, as compared with the variation amounts before modification. The method includes a step of relatively moving the partial patterns along the circumferential direction of the tire so as to reduce a total variation amount of characteristic values of at least two mutually adjacent partial patterns, as compared with the total variation amount before movement. The method includes a step of combining the partial patterns with each other to generate a tread pattern of the tire.

According to a second aspect of the present invention, in the first aspect of the present invention, the step of dividing the initial tread pattern into the plurality of partial patterns includes dividing the initial tread pattern into a variable number of partial patterns in accordance with a frequency of interest.

According to a third aspect of the present invention, in the first or second aspect of the present invention, the characteristic value of each one of the partial patterns includes at least one of: an area of a region in which the tire contacts the road surface; an area of a region in which the tire does not contact the road surface; and a volume of a space surrounded by the road surface and grooves of the tire, in a region in which the one of the partial patterns overlaps with a predetermined portion of the contact region.

According to a fourth aspect of the present invention, in the third aspect of the present invention, the predetermined portion of the contact region includes at least one of a front edge with its neighboring region, and a rear edge with its neighboring region, with respect to a traveling direction of the tire, in a region in which the tire contacts the road surface.

According to a fifth aspect of the present invention, in one of the first to fourth aspects of the present invention, the step of modifying the shapes of the partial patterns includes modifying the shapes of the partial patterns so as to reduce a magnitude of noise produced by the partial patterns to below a predetermined threshold in at least one predetermined frequency band.

According to a sixth aspect of the present invention, in one of the first to fifth aspects of the present invention, the step of relatively moving the partial patterns along the circumferential direction of the tire includes relatively moving the partial patterns along the circumferential direction of the tire so as to reduce a magnitude of noise produced by the at least two mutually adjacent partial patterns to below a predetermined threshold in at least one predetermined frequency band.

According to a seventh aspect of the present invention, in one of the first to sixth aspects of the present invention, the step of relatively moving the partial patterns along the circumferential direction of the tire includes calculating a total variation amount of weighted characteristic values of the at least two mutually adjacent partial patterns.

According to an eighth aspect of the present invention, a tread pattern generation apparatus generating a tread pattern of a tire is provided, the tread pattern generation apparatus is provided with a storage device and a processing device.

The storage device stores an initial tread pattern, and a contact region indicating a region in which the tire contacts a road surface. The processing device reads the initial tread pattern and the contact region from the storage device. The processing device divides the initial tread pattern into a plurality of partial patterns in a width direction of the tire. The processing device calculates calculating variation amounts of characteristic values of the partial patterns with respect to a circumferential direction of the tire, based on the contact region, each of the characteristic values indicating a shape of a corresponding partial pattern. The processing device modifies the shapes of the partial patterns so as to reduce the variation amounts of the characteristic values of the partial patterns, as compared with the variation amounts before modification. The processing device relatively moves the partial patterns along the circumferential direction of the tire so as to reduce a total variation amount of characteristic values of at least two mutually adjacent partial patterns, as compared with the total variation amount before movement. The processing device combines the partial patterns with each other to generate a tread pattern of the tire.

According to a ninth aspect of the present invention, a machine-readable and non-transitory storage medium storing a program for generating a tread pattern of a tire when being executed by a computer is provided. The program includes a step of reading an initial tread pattern and a contact region from a storage device, the contact region indicating a region in which the tire contacts a road surface. The program includes a step of dividing the initial tread pattern into a plurality of partial patterns in a width direction of the tire. The program includes a step of calculating variation amounts of characteristic values of the partial patterns with respect to a circumferential direction of the tire, based on the contact region, each of the characteristic values indicating a shape of a corresponding partial pattern. The program includes a step of modifying the shapes of the partial patterns so as to reduce the variation amounts of the characteristic values of the partial patterns, as compared with the variation amounts before modification. The program includes a step of relatively moving the partial patterns along the circumferential direction of the tire so as to reduce a total variation amount of characteristic values of at least two mutually adjacent partial patterns, as compared with the total variation amount before movement. The program includes a step of combining the partial patterns with each other to generate a tread pattern of the tire.

BRIEF DESCRIPTION OF DRAWINGS

FIG. 7 is a diagram showing an exemplary division of an initial tread pattern in step S3 of FIG. 6;

DETAILED DESCRIPTION

Hereinafter, a tread pattern generation system according to an embodiment will be described with reference to the drawings.

Figure 1:
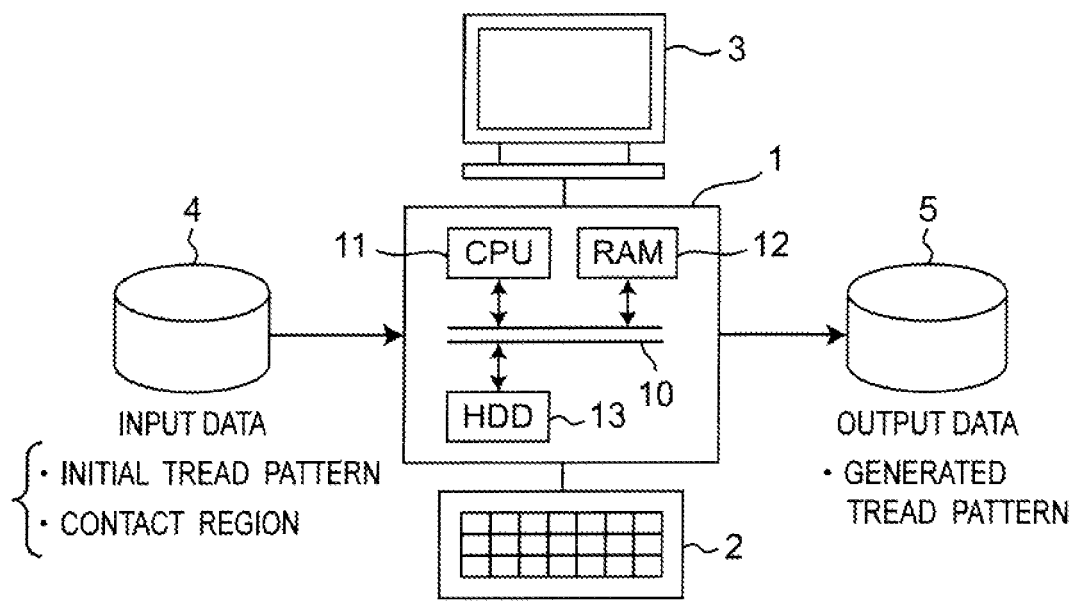
FIG. 1 is a block diagram showing a configuration of a tread pattern generation system according to an embodiment.

FIG. 1 is a block diagram showing a configuration of a tread pattern generation system according to an embodiment. The tread pattern generation system of FIG. 1 includes a processing device 1, an input device 2, a display device 3, and storage devices 4 and 5.

The processing device 1 includes a bus 10, a central processing unit (CPU) 11, a random access memory (RAM) 12, and a hard disk drive (HDD) 13. The processing device 1 may be, for example, a general-purpose computer, or any other computing device. The CPU 11, the RAM 12, and the HDD 13 are connected to each other by the bus 10. The HDD 13 is a machine-readable and non-transitory storage medium that stores a program of a tread pattern generation process to be described later with reference to FIG. 6. The program of the tread pattern generation process may be provided to the processing device 1 using a machine-readable, non-transitory, and removable storage medium, such as a flash memory or an optical disk. Alternatively, the program of the tread pattern generation process may be provided to the processing device 1 from a remote server apparatus via a communication network. The CPU 11 reads the program of the tread pattern generation process from the HDD 13 and executes it on the RAM 12 to generate a tread pattern.

The input device 2 includes a keyboard, a mouse, and the like, and receives user inputs.

The display device 3 indicates details of the tread pattern generation process (input data, output data, progression, and the like).

The storage device 4 stores input data for the tread pattern generation process, including an initial tread pattern and a contact region. The initial tread pattern indicates at least one initial value of a tread pattern of a tire, which is given in advance. The tread pattern is represented by, e.g., two-dimensional data (e.g., image data), including regions of structures contacting with a road surface (hereinafter, referred to as "blocks"), and region of structures not contacting with the road surface (hereinafter, referred to as "grooves"). The blocks and the grooves of the tread pattern are arranged in a first direction corresponding to a circumferential direction of the tire (also referred to as "circumferential direction" of the tread pattern), and in a second direction corresponding to a width direction of the tire (also referred to as "width direction" of the tread pattern). The tread pattern has a length corresponding to a circumference of the tire in its circumferential direction. The tread pattern may be represented by three-dimensional data, instead of two-dimensional data, in order to represent a depth of the groove. On the other hand, the contact region indicates a region in which the tire contacts a road surface.

The storage device 5 stores output data of the tread pattern generation process, that is, a generated tread pattern. The tread pattern stored in the storage device 5 may be further processed by the processing device 1. In addition, the tread pattern stored in the storage device 5 may be transmitted to other apparatuses, for example, a tire manufacturing apparatus or the like.

The processing device 1 may internally generate, for example, randomly generate the initial tread pattern, instead of reading the initial tread pattern from the storage device 4.

Next, production of noises by the tread patterns according to comparison examples will be described with reference to FIGS. 2 to 5.

Figure 2:
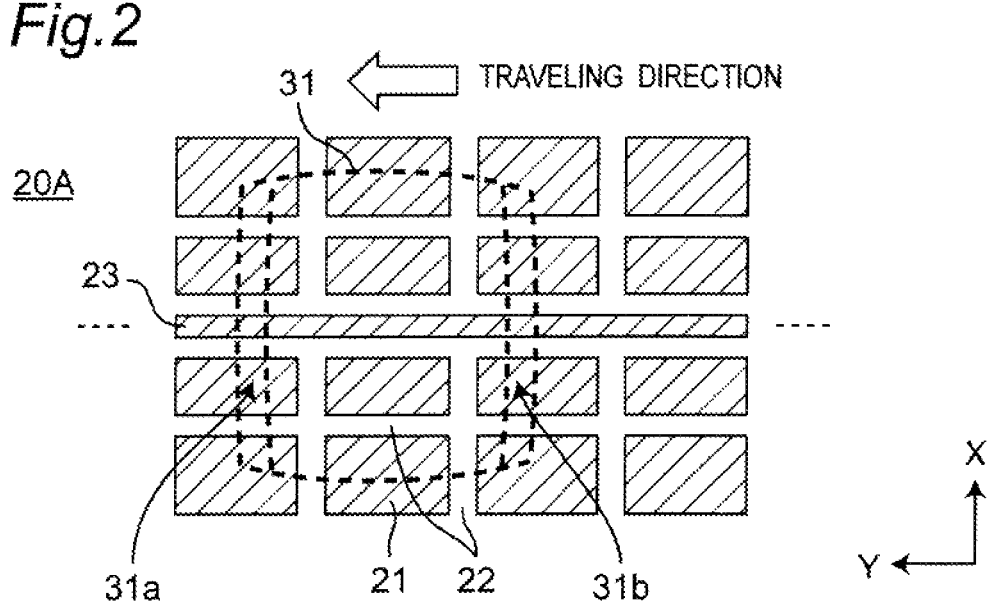
FIG. 2 is a diagram showing a tread pattern 20A according to a first comparison example.

FIG. 2 is a diagram showing a tread pattern 20A according to a first comparison example. In FIG. 2 and others, an X direction indicates the width direction of the tread pattern, and a Y direction indicates the circumferential direction of the tread pattern. The tread pattern 20A of FIG. 2 includes a plurality of blocks 21 and 23 having one or more shapes, and further includes a plurality of grooves 22. The plurality of blocks 21 are arranged in four rows along the circumferential direction of the tread pattern. The block 23 is wound around the entire circumference of the tire and along the circumferential direction of the tread pattern. A contact region 31 indicates a region in which the tire contacts the road surface, as described above, and includes the plurality of blocks 21 and the plurality of grooves 22. The contact region 31 has a width equal to or less than a width of the tread pattern 20A. The contact region 31 moves in the +Y direction on the tread pattern 20A as the tire travels (that is, as the tire rotates).

The contact region 31 includes a front edge region 31a including a front edge with its neighboring region, and a rear edge region 31b including a rear edge with its neighboring region, with respect to a traveling direction of the tire, in the region in which the tire contacts the road surface. As the tire travels, the tire changes in the front edge region 31a from not contacting with the road surface to contacting with the road surface, and changes in the rear edge region 31b from contacting with the road surface to not contacting with the road surface. Therefore, it is considered that as the tire travels, noises are likely to be produced particularly in the front edge region 31a and the rear edge region 31b.

In order to evaluate the noise produced by the tread pattern 20A of FIG. 2, the tread pattern 20A is scanned in the circumferential direction to calculate a variation amount of a characteristic value of the tread pattern 20A with respect to the circumferential direction, the characteristic value indicating a shape of the tread pattern 20A. The characteristic value of the tread pattern 20A indicates an area or a volume of a structure, in a region in which the tread pattern 20A overlaps with a predetermined portion of the contact region 31. Here, the predetermined portion of the contact region 31 includes at least one of the front edge region 31a and the rear edge region 31b. The characteristic value of the tread pattern 20A includes an area of the region in which the tire contacts the road surface (i.e., the region of the blocks 21 and 23), in the front edge region 31a and/or the rear edge region 31b. Additionally or alternatively, the characteristic value of the tread pattern 20A may include an area of the region in which the tire does not contact the road surface (i.e., the region of the grooves 22), in the front edge region 31a and/or the rear edge region 31b. Additionally or alternatively, the characteristic value of the tread pattern 20A may include a volume of a space surrounded by the road surface and the groove 22 of the tire, in the front edge region 31a and/or the rear edge region 31b. Additionally or alternatively, the characteristic value of the tread pattern 20A may include a ratio of the area of the region in which the tire contacts the road surface, and the area of the region in which the tire does not contact the road surface, in the front edge region 31a and/or the rear edge region 31b. The variation amount of the characteristic value of the tread pattern 20A is calculated as a difference or a ratio between a characteristic value of the tread pattern 20A at a position in the circumferential direction, and an averaged characteristic value of the tread pattern 20A obtained when scanning the tread pattern 20A in the circumferential direction.

In the tread pattern 20A of FIG. 2, the blocks 21 have front and rear edges substantially parallel to the X direction, respectively, and are arranged such that the front and rear edges of the blocks 21 of one row have the same positions in the circumferential direction as those of the other rows (that is, the blocks 21 of different rows are arranged in phase). Therefore, when the tire rotates, and the front edge region 31a and the rear edge region 31b meet the front and rear edges of the respective blocks, the characteristic value of the tread pattern 20A rapidly and largely varies. When the characteristic value of the tread pattern 20A rapidly and largely varies, the tire produces large noise. Therefore, in order to reduce noise produced by the tire, it is required to smooth and reduce the variation of the characteristic value of the tread pattern 20A.

Figure 3:
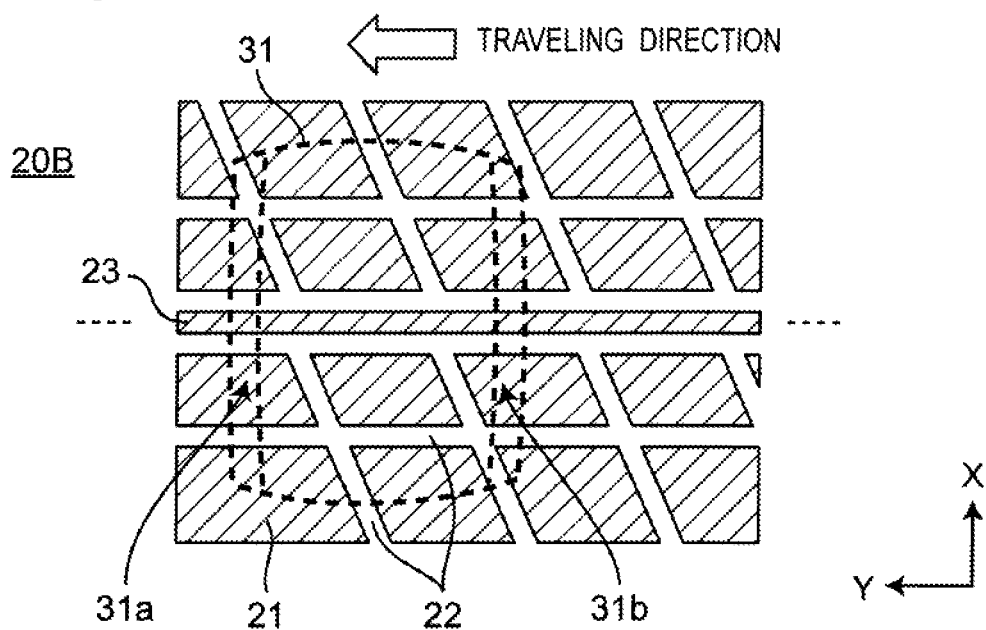
FIG. 3 is a diagram showing a tread pattern 20B according to a second comparison example.

FIG. 3 is a diagram showing a tread pattern 20B according to a second comparison example. In the tread pattern 20B of FIG. 3, the blocks 21 have front and rear edges inclined at an angle larger than 0 degrees and smaller than 90 degrees with respect to the X direction, respectively, and are arranged such that the front and rear edges of the blocks 21 of one row have different positions in the circumferential direction from those of the other rows. Therefore, in the tread pattern 20B of FIG. 3, it is possible to smooth and reduce variation of the characteristic value of the tread pattern 20B, as compared with that of the tread pattern 20A of FIG. 2.

If the tire is a noise source of a single point, it is possible to reduce noise produced by the tire, by smoothing and reducing the variation of the characteristic value of the tread pattern. However, indeed, a plurality of mutually different points in a region in which the tire contacts the road surface may act as a plurality of mutually different noise sources, as described above.

Figure 4:
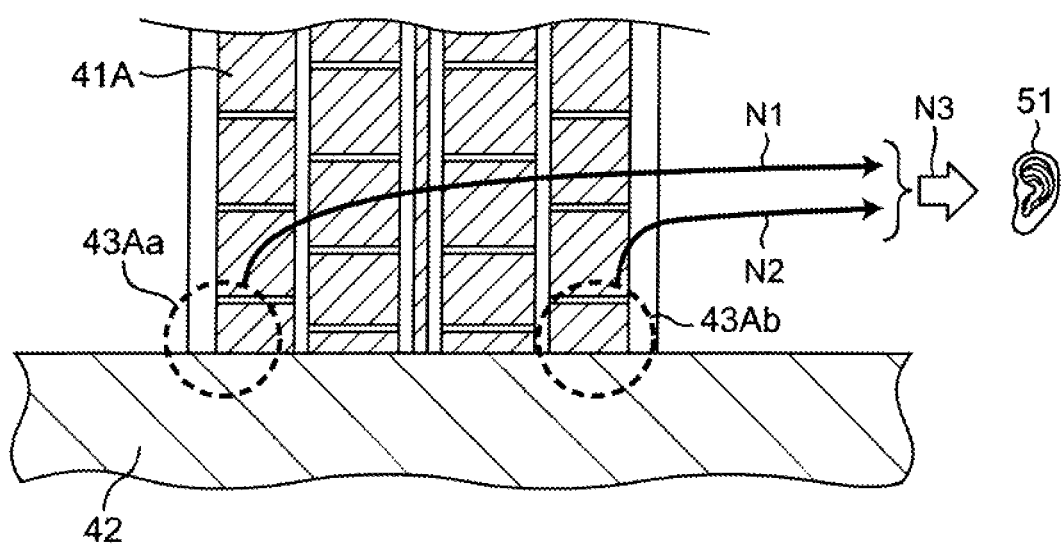
FIG. 4 is a diagram showing production of noises N1 to N3 by a tread pattern according to a third comparison example.

FIG. 4 is a diagram showing production of noises N1 to N3 by a tread pattern according to a third comparison example. FIG. 4 shows a front view of a tire 41A traveling on a road surface 42. The left side of FIG. 4 shows an inside of a vehicle (not shown), and the right side of FIG. 4 shows an outside of the vehicle. Referring to FIG. 4, on the right side of the tire 41A, there is an observer 51, such as a pedestrian, or a neighborhood resident near a road. A region inside the tire 41A acts as a noise source 43Aa, and a region outside the tire 41A acts as a noise source 43Ab. The noise N1 produced by the noise source 43Aa and the noise N2 produced by the noise source 43Ab reach the observer 51 as a combined noise N3.

Figure 5:
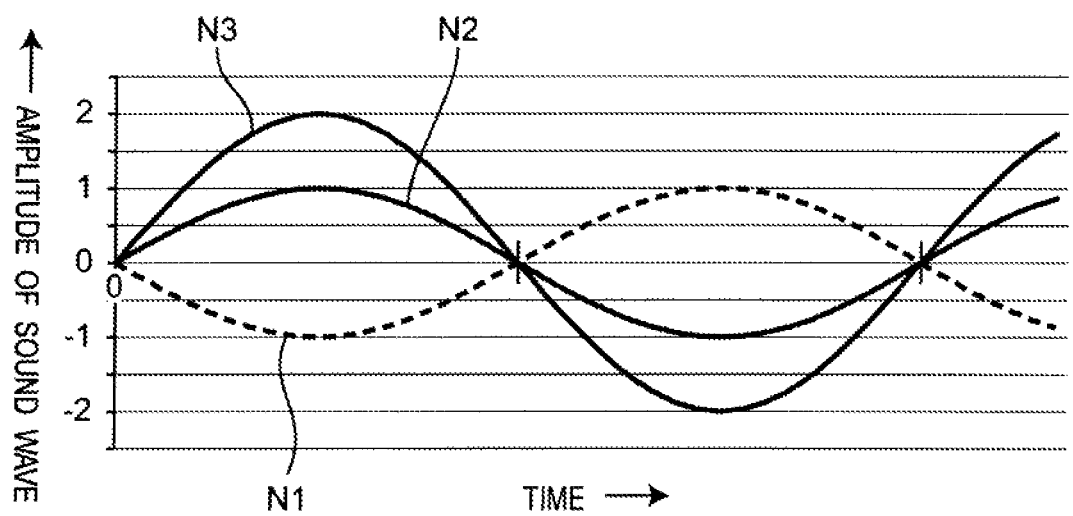
FIG. 5 is a graph showing waveforms of the noises N1 to N3 of FIG. 4.

FIG. 5 is a graph showing waveforms of the noises N1 to N3 of FIG. 4. For ease of illustration, FIG. 5 shows each of the noises N1 to N3 as a sinusoidal wave of a single frequency, but indeed, each of the noises N1 to N3 may include a plurality of frequency components.

An example of FIG. 5 shows a case where a tread pattern of the tire 41A is made so as to produce the noises N1 and N2 with mutually opposite phases, in order to mutually cancel the noises N and N2. Although the noises N1 and N2 can be mutually cancelled at positions equidistant from the noise sources 43Aa and 43Ab, the noises N1 and N2 can not be mutually cancelled at other positions, for example, the position of the observer 51 of FIG. 4. Assuming that sound propagates in static air, the noises N1 and N2 produced by the noise sources 43Aa and 43Ab reach the observer 51 at the sound speed in the air, with a delay time corresponding to a difference in distance. For example, a sound of 1 kHz has a wavelength of about 34 cm. For example, when the noises N1 and N2 have a frequency of 1 kHz, and a distance from the noise source 43Aa to the observer 51 is longer than a distance from the noise source 43Ab to the observer 51 by 17 cm, the noise N1 reaches the observer 51 with a phase delayed by a half wavelength with respect to the phase of the noise N2. In this case, the phase of the noise N1 is the same as that of the noise N2 at the position of the observer 51, and therefore, the constructively combined noise N3 reaches the observer 51.

Therefore, in order to solve this problem, the present inventor has found generation of a tread pattern so as to reduce noise with higher precision than the comparison examples described above, in consideration with a plurality of mutually different noise sources within a real tire. Hereinafter, with reference to FIGS. 6 to 14, we will describe an operation of the tread pattern generation system capable of generating such a tread pattern according to the embodiment.

Figure 6:
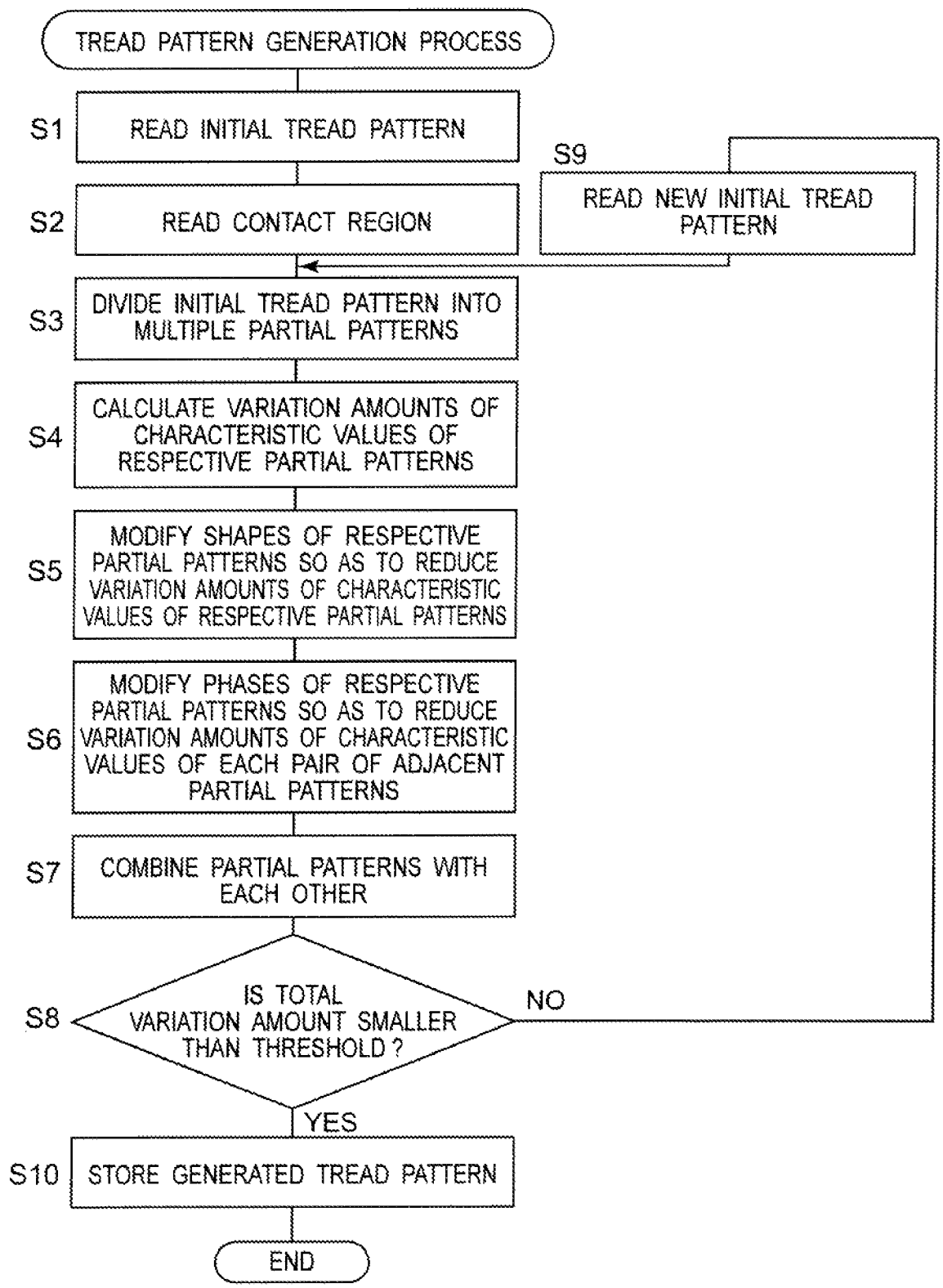
FIG. 6 is a flowchart showing a tread pattern generation process executed by a processing device 1 of FIG. 1.

FIG. 6 is a flowchart showing the tread pattern generation process executed by the processing device 1 of FIG. 1.

In step S1 of FIG. 6, the processing device 1 reads an initial tread pattern from the storage device 4. In step S2, the processing device 1 reads a contact region from the storage device 4. In step S3, the processing device 1 divides the initial tread pattern into a plurality of partial patterns.

FIG. 7 is a diagram showing an exemplary division of the initial tread pattern in step S3 of FIG. 6. FIG. 7 shows a part of the initial tread pattern read from the storage device 4, with respect to the circumferential direction, as a tread pattern 20, and further shows the contact region 31. The tread pattern 20 itself is substantially similar to the tread patterns 20A and 20B shown in FIGS. 2 and 3, respectively. The contact region 31 of FIG. 7 is also similar to the contact region 31 shown in FIGS. 2 and 3. The processing device 1 divides the tread pattern 20 into a plurality of mutually adjacent partial patterns W1 to W4, each having a width smaller than the width of the tread pattern 20, by a plurality of straight lines along the circumferential direction of the tread pattern 20. In other words, the processing device 1 divides the tread pattern 20 into the plurality of partial patterns in the width direction of the tire. In an example of FIG. 7, boundaries among the partial patterns W1 to W4 are provided on the grooves 22 or on the block 23 extending in the circumferential direction of the tread pattern 20. Alternatively, the boundaries may be provided on the blocks 21.

In step S4 of FIG. 6, the processing device 1 scans the partial patterns in the circumferential direction of the tread pattern 20, respectively, and calculates variation amounts of characteristic values of the partial patterns W1 to W4 with respect to the circumferential direction of the tread pattern 20, based on the contact region 31, respectively. The variation amounts of the characteristic values of the partial patterns W1 to W4 are calculated in a manner substantially similar to that of the variation amount of the characteristic value of the entire tread pattern 20A, as described with reference to FIG. 2.

The characteristic value of the partial pattern W1 indicates an area or a volume of a structure, in a region in which the partial pattern W1 overlaps with a predetermined portion of the contact region 31. The predetermined portion of the contact region 31 includes at least one of the front edge region 31a and the rear edge region 31b. The characteristic value of the partial pattern W1 includes an area of the region in which the tire contacts the road surface (i.e., the region of the blocks 21 and 23), in the region in which the partial pattern W1 overlaps with the front edge region 31a and/or the rear edge region 31b. Additionally or alternatively, the characteristic value of the partial pattern W1 may include an area of the region in which the tire does not contact the road surface (i.e., the region of the grooves 22), in the region in which the partial pattern W1 overlaps with the front edge region 31a and/or the rear edge region 31b. Additionally or alternatively, the characteristic value of the partial pattern W1 may include a volume of a space surrounded by the road surface and the groove 22 of the tire, in the region in which the partial pattern W1 overlaps with the front edge region 31a and/or the rear edge region 31b. Additionally or alternatively, the characteristic value of the partial pattern W1 may include a ratio of the area of the region in which the tire contacts the road surface, and the area of the region in which the tire does not contact the road surface, in the region in which the partial pattern W1 overlaps with the front edge region 31a and/or the rear edge region 31b. The variation amount of the characteristic value of the partial pattern W1 is calculated as a difference or a ratio between a characteristic value of the partial pattern W1 at a position in the circumferential direction, and an averaged characteristic value of the partial pattern W1 obtained when scanning the partial pattern W1 in the circumferential direction.

The predetermined portion of the contact region 31 may be a front edge and/or a rear edge of the contact region 31, instead of the front edge region 31a and/or the rear edge region 31b. In this case, the characteristic value of the partial pattern W indicates the number of pixels of structures overlapping with these edges.

The variation amounts of the characteristic values of the partial patterns W2 to W4 are also calculated in a manner similar to that of the variation amount of the characteristic value of the partial pattern W1.

In step S5, the processing device 1 modifies shapes of the partial patterns W1 to W4 so as to reduce the variation amounts of the characteristic values of the partial patterns W1 to W4, as compared with the variation amounts before modification.

Figure 8A:
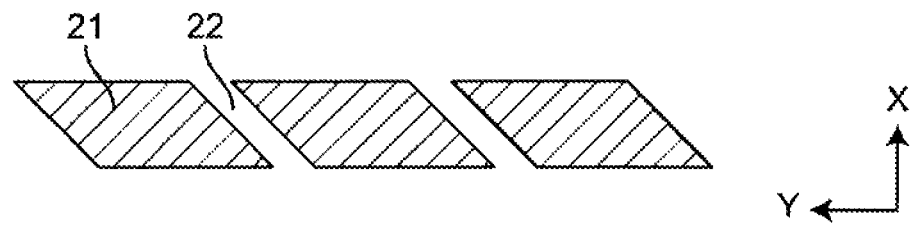
FIG. 8A is a diagram showing an original partial pattern W1 to be processed in step S5 of FIG. 6.
Figure 8B:
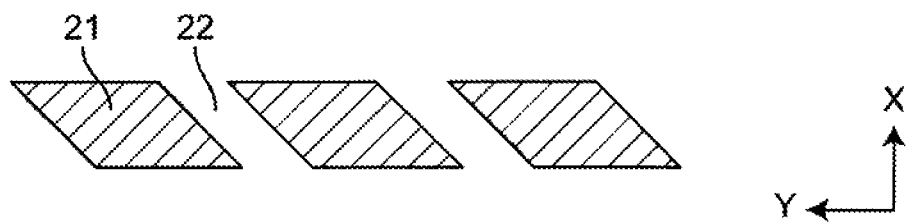
FIG. 8B is a diagram showing a first exemplary modification of the partial pattern W1 of FIG. 8A.
Figure 8C:
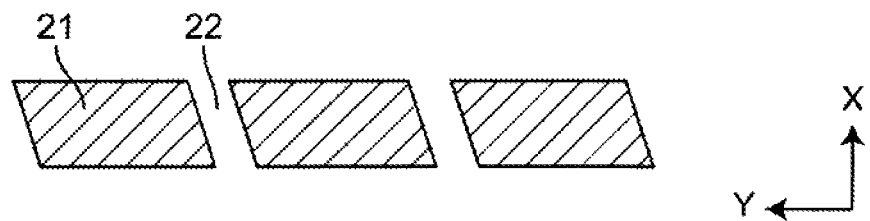
FIG. 8C is a diagram showing a second exemplary modification of the partial pattern W1 of FIG. 8A.
Figure 8D:
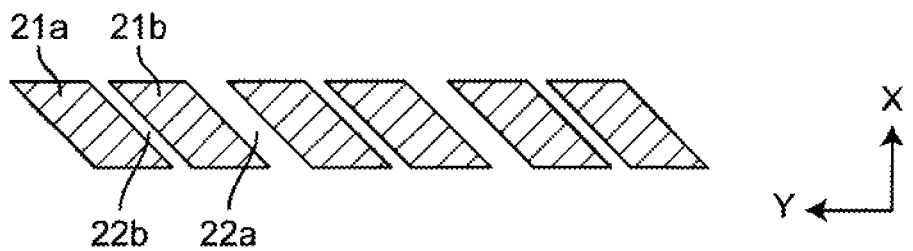
FIG. 8D is a diagram showing a third exemplary modification of the partial pattern W1 of FIG. 8A.

FIGS. 8A to 8D are diagrams showing exemplary modifications of the shapes of the partial patterns in step S5 of FIG. 6. FIG. 8A is a diagram showing an original partial pattern W1 to be processed in step S5 of FIG. 6. FIG. 8B is a diagram showing a first exemplary modification of the partial pattern W1 of FIG. 8A. FIG. 8C is a diagram showing a second exemplary modification of the partial pattern W of FIG. 8A. FIG. 8D is a diagram showing a third exemplary modification of the partial pattern W1 of FIG. 8A. As shown in FIG. 8B, the width of the grooves 22 (or an interval of the blocks 21) may be increased or decreased. As shown in FIG. 8C, the angle of edges of the blocks 21 with respect to the X direction and the Y direction may be increased or decreased. As shown in FIG. 8D, the number of grooves and/or the number of blocks may be increased or decreased. The example of FIG. 8D shows blocks 21a and 21b, and grooves 22a and 22b. As long as it is possible to reduce the variation amount of the characteristic value of the partial pattern W1, the partial pattern W1 is not limited to the shapes shown in FIGS. 8B to 8D, and may be modified to any other shapes.

The shapes of the partial patterns W2 to W4 are also modified in a manner similar to that of the shape of the partial pattern W1.

Figure 9:
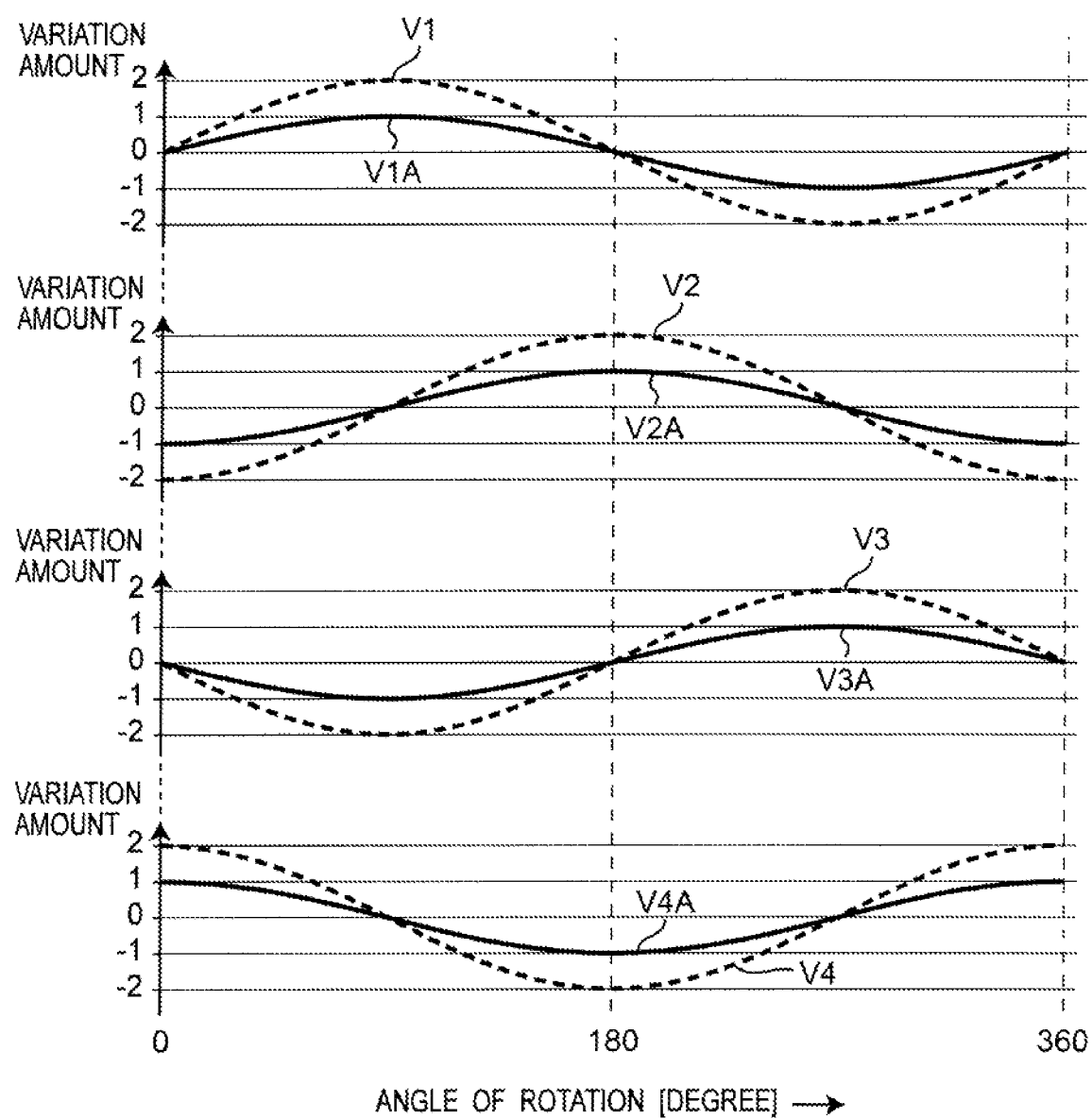
FIG. 9 is a set of graphs showing variation amounts V1 to V4 of partial patterns calculated in step S4 of FIG. 6, and variation amounts V1A to V4A of partial patterns with shapes modified in step S5 of FIG. 6.
Figure 10:
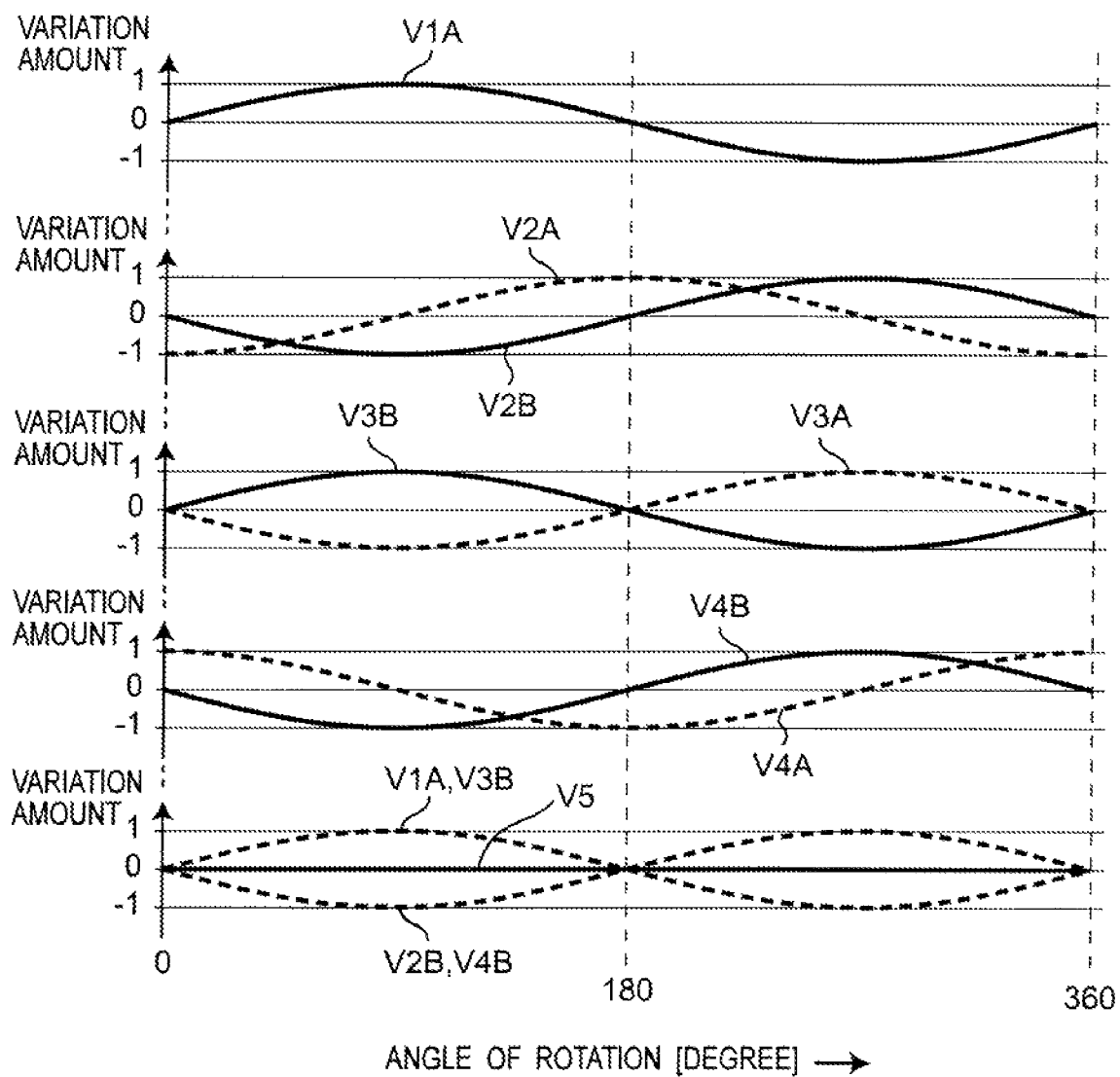
FIG. 10 is a set of graphs showing the variation amounts V1A to V4A of the partial patterns with shapes modified in step S5 of FIG. 6, variation amounts V2B to V4B of partial patterns with phases modified in step S6 of FIG. 6, and a total variation amount V5 of the variation amounts V1A, and V2B to V4B.

FIG. 9 is a graph showing variation amounts V1 to V4 of partial patterns calculated in step S4 of FIG. 6, and variation amounts V1A to V4A of partial patterns with shapes modified in step S5 of FIG. 6. For ease of illustration, FIGS. 9 and 10 show each of the variation amounts as a sinusoidal wave with a cycle corresponding one revolution of the tire. However, indeed, the variation amounts have more complicated waveforms that periodically or non-periodically change within a smaller angular range (e.g., an angular range corresponding to a minimum cycle in which the blocks 21 or the grooves 22 are arranged), according to the shapes of the partial patterns W1 to W4. In an example of FIG. 9, it is assumed that the variation amounts V1 to V4 have the same amplitude with each other. In addition, vertical axes of graphs of FIG. 9 have scales normalized with reference to the amplitude of the variation amount V1A of the partial pattern W1 with a shape modified in step S5. As shown in FIG. 9, by executing step S5, the variation amounts V1 to V4 of the partial patterns W1 to W4 are reduced to the variation amounts V1A to V4A by half.

In step S6 of FIG. 6, the processing device 1 relatively moves the partial patterns W1 to W4, whose shapes have been modified in step S5, along the circumferential direction of the tire, so as to reduce a total variation amount of the characteristic values of at least two mutually adjacent partial patterns, as compared with the total variation amount before movement. In other words, the processing device 1 modifies phases (i.e., angles of rotation in the circumferential direction of the tire) of the partial patterns W1 to W4. In this case, the processing device 1 modifies the phases of the partial patterns, for example, so as to reduce a total variation amount of the characteristic values of each pair of mutually adjacent partial patterns. The processing device 1 may modify the phases of the partial patterns, for example, so as to reduce a total variation amount of the characteristic values of three or more mutually adjacent partial patterns. In addition, in a case where the tread pattern 20 includes a partial pattern not affecting reduction of the variation amount of the characteristic value even if modifying its phase, such as a partial pattern consisting of only the block 23, the processing device 1 may modify the phases of the partial patterns, so as to reduce a total variation amount of a characteristic value of such a non-affecting partial pattern and characteristic values of partial patterns on both sides thereof, (substantially, the processing device 1 only modifies the phases of the partial patterns on both sides of the non-affecting partial pattern).

FIG. 10 is a set of graphs showing the variation amounts V1A to V4A of the partial patterns with shapes modified in step S5 of FIG. 6, variation amounts V2B to V4B of partial patterns with phases modified in step S6 of FIG. 6, and a total variation amount V5 of the variation amounts V1A, and V2B to V4B. As shown in a second graph of FIG. 10, the partial pattern W2 is moved along the circumferential direction of the tread pattern 20, such that the variation amounts of the characteristic values of the partial patterns W1 and W2 are mutually cancelled. The partial pattern W2 after such movement has the variation amount V2B. As shown in a third graph of FIG. 10, the partial pattern W3 is moved along the circumferential direction of the tread pattern 20, such that the variation amounts of the characteristic values of the partial patterns W2 and W3 are mutually cancelled. The partial pattern W3 after such movement has the variation amount V3B. As shown in a fourth graph of FIG. 10, the partial pattern W4 is moved along the circumferential direction of the tread pattern 20, such that the variation amounts of the characteristic values of the partial patterns W3 and W4 are mutually cancelled. The partial pattern W4 after such movement has the variation amount V4B. By mutually cancelling the variation amounts of the characteristic values of each pair of mutually adjacent partial patterns, the total variation amount V5 also becomes zero as shown in the fifth graph of FIG. 10. In FIG. 10, the phases of the partial patterns W2 to W4 are adjusted to the phase of the partial pattern W1. Alternatively, the phases of the respective partial patterns may be adjusted to one of the partial patterns W2 to W4, or to any other phase.

In step S6, the variation amounts of the characteristic values of at least two mutually adjacent partial patterns are not limited to be completely cancelled with each other, but may be at least partially cancelled with each other. In addition, the variation amounts of the characteristic values of the respective partial patterns W1 to W4 are not limited to the case of having the same cycle, and may have mutually different cycles, or may be acyclic. Even in such a case, in step S6, it is sufficient that the variation amounts of the characteristic values of at least two mutually adjacent partial patterns can be at least partially cancelled with each other. In this way, the total variation amount V5 can be reduced as compared with that of before execution of step S6.

In step S7 of FIG. 6, the processing device 1 combines the individual partial patterns W1 to W4, whose phases have been modified in step S6, with each other, to generate a tread pattern of the tire. In step S8, the processing device 1 determines whether or not the total variation amount of the generated entire tread pattern is smaller than a predetermined threshold; if YES, the process proceeds to step S10, and if NO, the process proceeds to step S9. The threshold is determined in accordance with a desired magnitude of noise produced by the entire tread pattern.

Figure 11:
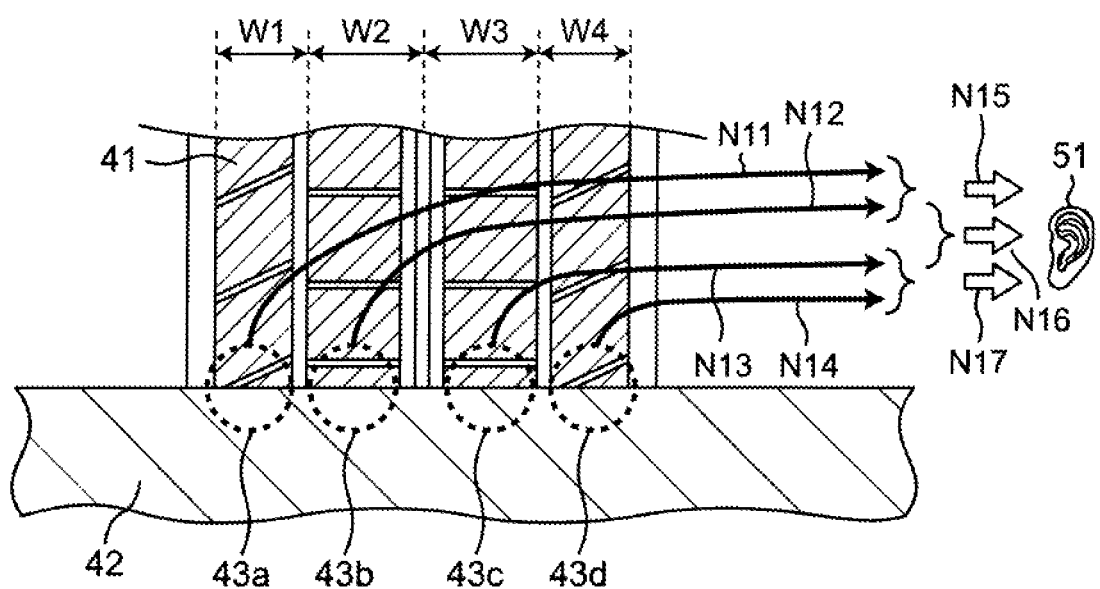
FIG. 11 is a diagram showing production of noises N11 to N14 by respective partial patterns modified in accordance with the embodiment, and showing noises N15 to N17 mutually cancelled by each pair of mutually adjacent partial patterns.
Figure 12:
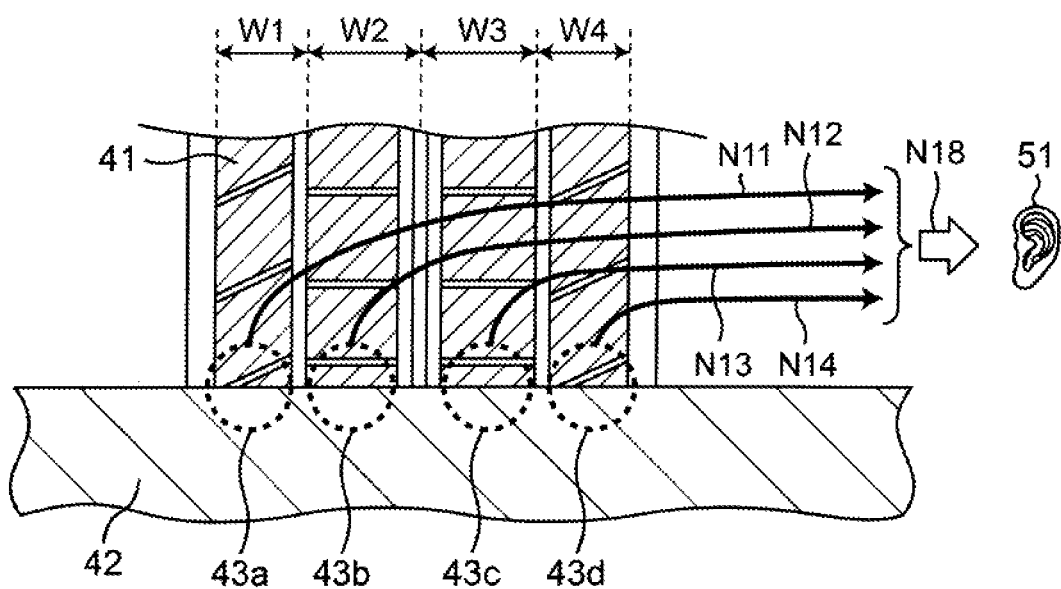
FIG. 12 is a diagram showing production of the noises N11 to N14 by respective partial pattern modified in accordance with the embodiment, and showing a combined noise N18.

FIG. 11 is a diagram showing production of noises N11 to N14 by respective partial pattern modified in accordance with the embodiment, and showing noises N15 to N17 mutually cancelled by each pair of mutually adjacent partial patterns. FIG. 12 is a diagram showing production of the noises N11 to N14 by respective partial pattern modified in accordance with the embodiment, and showing a combined noise N18. FIGS. 11 and 12 show a case where the partial patterns W1 to W4 act as mutually different noise sources 43a to 43d.

The noises N11 and N12 produced by the noise sources 43a and 43b reach the observer 51 as a mutually combined noise N15. At this time, since the variation amounts of the characteristic values of the partial patterns W1 and W2 are reduced by executing the step S5, the magnitudes of the noises N11 and N12 are also reduced. In addition, since a total variation amount of the characteristic values of the partial patterns W1 and W2 is reduced by executing step S6, the magnitude of the combined noise N15 is also reduced.

Similarly, the noises N12 and N13 produced by the noise sources 43b and 43c reach the observer 51 as a mutually combined noise N16. At this time, magnitudes of the noises N12 and N13 are reduced by executing step S5, and a magnitude of the combined noise N16 is also reduced by executing step S6.

Similarly, the noises N13 and N14 produced by the noise sources 43c and 43d reach the observer 51 as a mutually combined noise N17. At this time, magnitudes of the noises N13 and N14 are reduced by executing step S5, and a magnitude of the combined noise N17 is also reduced by executing step S6.

In step S6, it is also possible to similarly reduce the magnitude of the combined noise, in the case where the phases of the partial patterns are modified so as to reduce a total variation amount of the characteristic values of three or more mutually adjacent partial patterns, as described above.

In addition, as shown in FIG. 12, the noises N11 to N14 produced by the noise sources 43a to 43d reach the observer 51 as the total noise N18 of the entire tread pattern. At this time, since a total variation amount of the characteristic values of the individual partial patterns W1 to W4 is reduced by executing steps S5 and S6, the magnitude of the total noise N18 is also reduced.

Each of FIGS. 11 and 12 show a case where the observer 51 exists on the right side of a tire 41 (i.e., outside the vehicle). However, according to the embodiment, even if the observer 51 exists at any other position, for example, inside the vehicle, the magnitude of the total noise reaching the observer 51 is reduced by executing steps S5 and S6.

If step S8 of FIG. 6 is NO, then in step S9, the processing device 1 reads a new initial tread pattern from the storage device 4, and repeats steps S3 to S8.

If step S8 is YES, then in step S10, the processing device 1 stores the generated tread pattern in the storage device 5.

As described above, according to the tread pattern generation process of FIG. 6, it is possible to generate a tread pattern so as to reduce noise with higher precision than that of the prior art, by dividing a tread pattern into a plurality of partial patterns, reducing variation amounts of characteristic values of the partial patterns, and reducing total variation amounts of the characteristic values of at least two mutually adjacent partial patterns. In particular, by reducing the variation amounts of the characteristic values of the partial patterns, it is possible to reduce the magnitude of noise produced in a small region including a noise source. Further, by reducing the total variation amounts of the characteristic values of at least two mutually adjacent partial patterns, it is possible to reduce the magnitude of a total noise produced in a region including noise sources close to each other. As a result, a phenomenon as described with reference to FIGS. 4 and 5, that is, constructive combination of noises produced by a plurality of mutually different noise sources, less likely occurs, and the total noise produced in the entire tire is also reduced.

Figure 13:
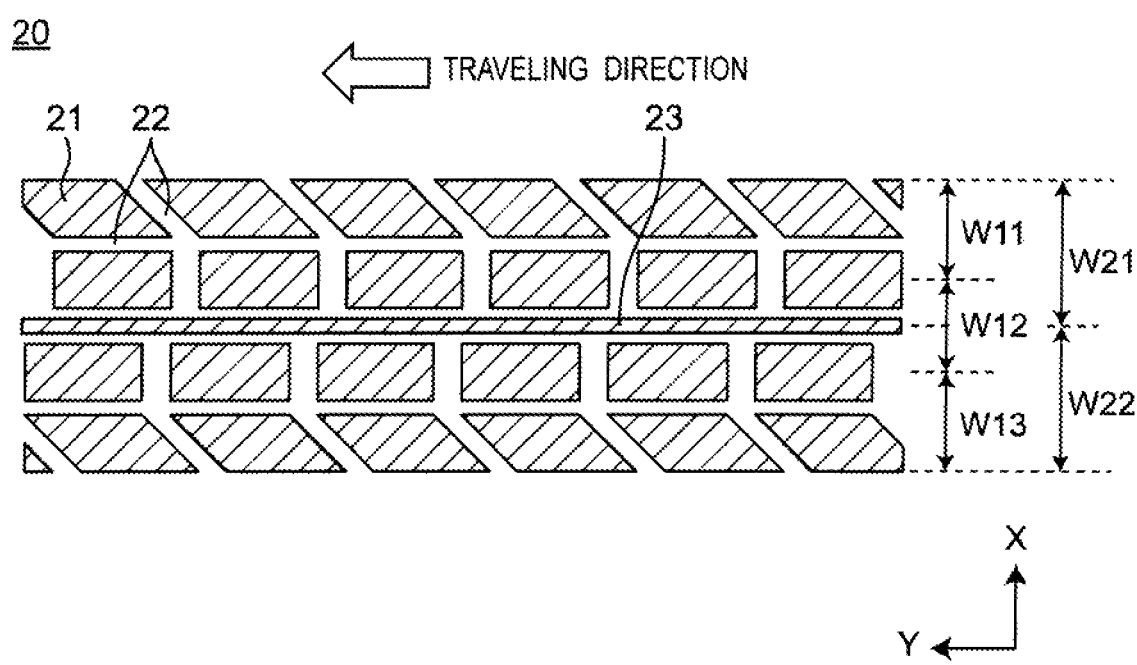
FIG. 13 is a diagram showing another exemplary division of the initial tread pattern in step S3 of FIG. 6.
Figure 14:
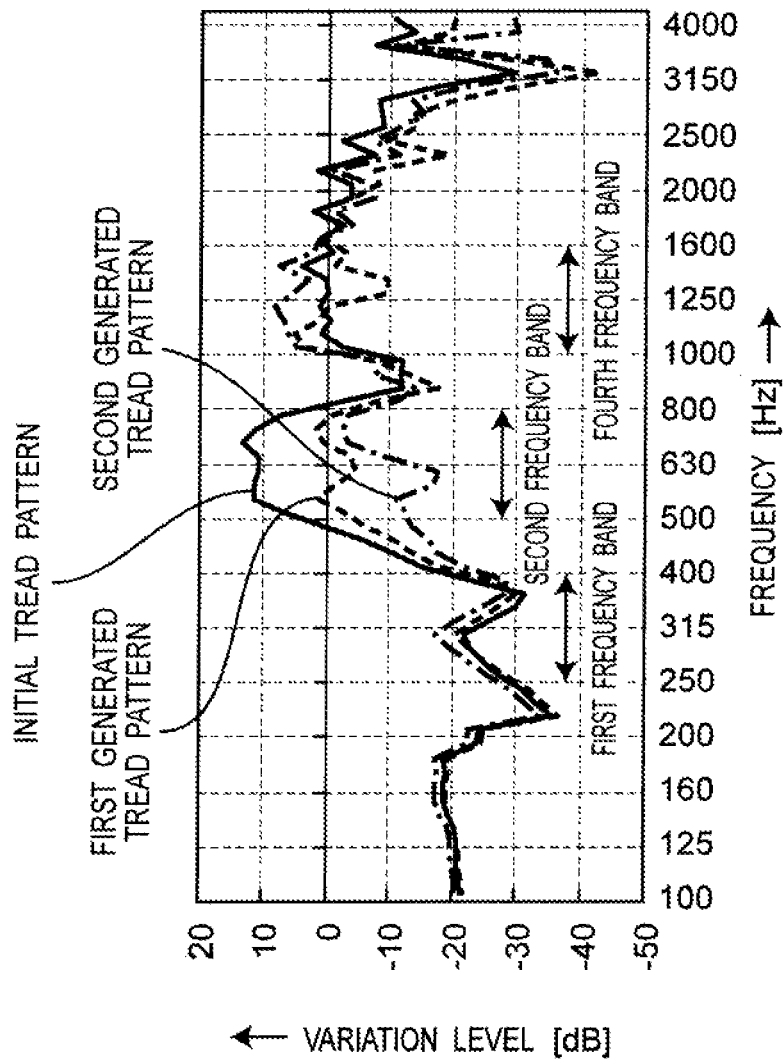
FIG. 14 is a graph showing variation levels in frequency region of exemplary first and second tread patterns generated in accordance with the embodiment.
Figure 15:
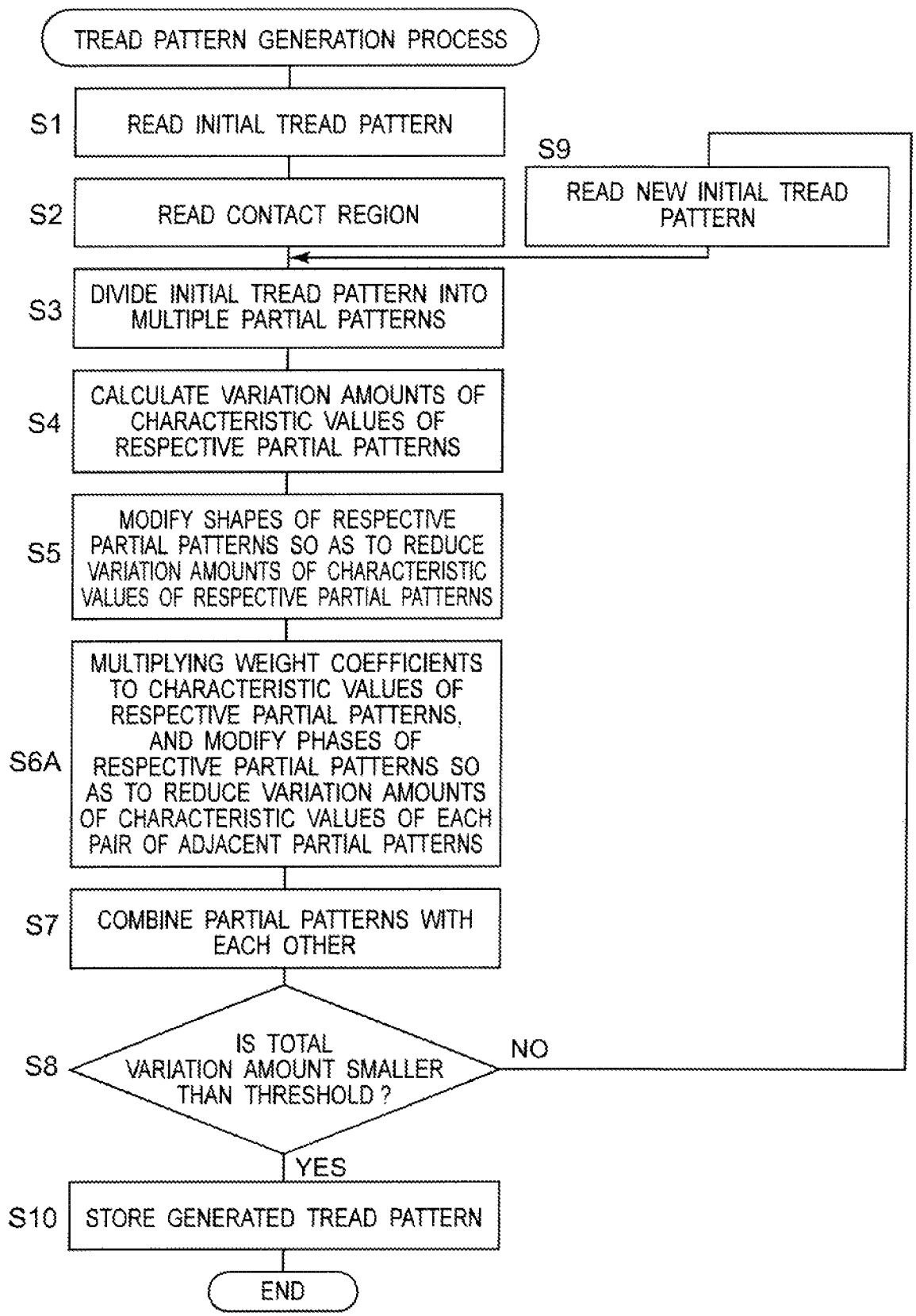
FIG. 15 is a flowchart showing a modified embodiment of a tread pattern generation process executed by the processing device 1 of FIG. 1.

Next, with reference to FIGS. 13 to 15, we will describe modified embodiments.

FIG. 13 is a diagram showing another exemplary division of the initial tread pattern in step S3 of FIG. 6. A processing device 1 may divide the initial tread pattern into a variable number of partial patterns in accordance with a frequency of interest in which noise is to be reduced.

The tire is not limited to include only four noise sources 43a to 43d as shown in FIGS. 11 and 12, but indeed, each point along a width direction of the tire acts as a noise source. A plurality of points close to each other can be regarded as a substantially identical noise source. A distance that allows the plurality of points to be regarded as a substantially identical noise source is set to be, for example, equal to or less than a half of the wavelength of noise, for example, one tenth of the wavelength of noise. For example, when the noise has a wavelength of about 34 cm (i.e., a frequency of about 1 kHz), a width of each partial pattern may be set to 3.4 cm, which is one tenth of the wavelength.

In a case of reducing noise having a frequency lower than that in the case of FIG. 7, the tread pattern 20 may be divided into three partial patterns W11 to W13 as shown in FIG. 13. In a case of reducing noise having an even lower frequency, the tread pattern 20 may be divided into two partial patterns W21 to W22. In addition, when the frequency of interest varies in accordance with a traveling speed of the tire, the width of each partial pattern may be modified in accordance with the traveling speed. The processing device 1 divides the initial tread pattern into a plurality of mutually adjacent partial patterns, each having a width smaller than the width of the initial tread pattern, by at least one straight line along the circumferential direction of the initial tread pattern. In this way, by dividing the initial tread pattern into a variable number of partial patterns in accordance with the frequency of interest, it is possible to model noise sources with high precision in accordance with the size of the noise sources, and to reduce noise with high precision.

FIG. 14 is a graph showing variation levels in frequency region of exemplary first and second tread patterns generated in accordance with the embodiment. The variation level indicates values obtained by converting the variation amount of the characteristic value of the entire tread pattern into a frequency domain. Referring to FIG. 14, a frequency band near 300 Hz is shown as "first frequency band", a frequency band near 600 Hz as "second frequency band", and a frequency band near 1200 Hz as "fourth frequency band". Different tread patterns may have different variation levels depending on the frequency band. According to an example of FIG. 14, in the first frequency band, the first and second tread patterns have substantially the same variation level. In addition, in the second frequency band, the second tread pattern has a smaller variation level than that of the first tread pattern. In addition, in the fourth frequency band, the first tread pattern has a smaller variation level than that of the second tread pattern.

When executing step S5 of FIG. 6, the processing device 1 may optimize shapes of partial patterns in accordance with a desired frequency in which noise is to be reduced. In this case, the processing device 1 converts variation amounts of characteristic values of partial patterns into the frequency domain, using the Fast Fourier Transform or the like. Further, the processing device 1 modifies the shapes of the partial patterns, so as to reduce noise produced by the partial patterns to below a predetermined threshold, in at least one predetermined frequency band.

Similarly, when executing step S6 of FIG. 6, the processing device 1 may optimize phases of partial patterns in accordance with a desired frequency in which noise is to be reduced. In this case, the processing device 1 converts variation amounts of the characteristic values of partial patterns into the frequency domain, using Fast Fourier Transform or the like. Further, the processing device 1 relatively moves the partial patterns along the circumferential direction of the tire, so as to reduce a noise produced by at least two mutually adjacent partial patterns to below a predetermined threshold, in at least one predetermined frequency band.

The processing device 1 calculates an objective function value associated with the shape of the tread pattern, based on the variation level in one or more frequency bands. The objective function value is calculated based on total energies or peak values of the variation level in various frequency bands. In this specification, a total energy of the variation level in a specific frequency band is referred to as "partial overall level (POAL) value". In addition, the total energy of the variation level in all frequency bands is referred to as "overall level (OAL) value".

In a case of optimizing shapes or phases of partial patterns in accordance with a desired frequency in which noise is to be reduced, the processing device 1 can use various objective functions under various constraint conditions, depending on details of the optimization. For example, the following constraint conditions and objective functions may be used.

(1) Under a constraint condition that the POAL values are equal to or less than a threshold in all the first, second, and fourth frequency bands, an objective function consisting of a POAL value of any of the frequency bands is minimized. In this case, the magnitude of noise can be reduced in a frequency band including a significantly large noise, among the first, second, and fourth frequency bands.

(2) Under a constraint condition that the POAL value in the second frequency band is reduced to 80% or less of a POAL value of the initial tread pattern, and the POAL value in the fourth frequency band is reduced to 110% or less of the POAL value of the initial tread pattern, an objective function consisting of a POAL value of the second frequency band is minimized. In this case, even if noise in the fourth frequency band increases to an extent, noise in the second frequency band can be particularly reduced.

(3) Under a constraint condition that the POAL value in the second frequency band is reduced to 90% or less of the POAL value of the initial tread pattern, and an OAL value in all the frequency bands is reduced to equal to or less than an OAL value of the initial tread pattern, an objective function consisting of a POAL value of the second frequency band is minimized. In this case, noise in the second frequency band is particularly reduced, but noise in all the frequency bands is not increased more than noise of the initial tread pattern.

(4) A weighting coefficient of 0.1 is set to a POAL value of the first frequency band, a weighting coefficient of 0.5 is set to the POAL value of the second frequency band, a weighting coefficient of 0.4 is set to a POAL value of the fourth frequency band, and an objective function consisting of a total of the weighted POAL values is minimized. In this case, the first, second, and fourth frequency bands are taken into consideration, but the second frequency band is emphasized rather than the fourth frequency band, and the first frequency band is not focused.

(5) A weighting coefficient of 0.1 is set to the POAL value of the first frequency band, a weighting coefficient of 0.5 is set to the POAL value of the second frequency band, a weighting coefficient of 0.4 is set to the POAL value of the fourth frequency band, and an objective function consisting of a total of the weighted POAL values is iteratively calculated for a fixed number of times or for a fixed time, while modifying shapes (step S5) or phases (step S6) of partial patterns. In this case, even if the objective function value does not reach some target value, the calculation ends after the fixed number of times or the fixed time, and an optimum one among them can be selected.

(6) Under a constraint condition that peak values are equal to or less than a threshold in all the first, second, and fourth frequency bands, an objective function consisting of a peak value of any of the frequency bands is minimized. In this case, it is possible to reduce the peak value, rather than the POAL value, of each frequency band.

For example, in a case of generating a tread pattern having a POAL value in the second frequency band smaller than the POAL value of the initial tread pattern, an objective function may be used so as to focus on the variation level of the second frequency band, and also satisfy other targets.

In addition, even if the constraint condition or the objective function value has not reached the threshold, an evaluation value indicating how close to the threshold may be calculated, and a tread pattern may be generated based on the evaluation value. For example, under a constraint condition that the POAL value in the second frequency band is reduced to 80% or less of the POAL value of the initial tread pattern, the objective function consisting of the POAL value of the fourth frequency band may be minimized. In this case, when the POAL value of the fourth frequency band becomes 110% or less of the POAL value of the initial tread pattern, the constraint condition of the above case (2) is satisfied. On the other hand, even when only a solution is found in which the POAL value in the fourth frequency band is more than 110% of the POAL value of the initial tread pattern, the objective function value can be minimized under the constraint condition.

Variation levels (e.g., POAL values or peak values) of various frequency bands are appropriately set to the constraint condition or the objective function. A variation level of the frequency band that must be reduced to equal to or less than the threshold is set as the constraint condition. On the other hand, a variation level of the frequency band that is desirably reduced as much as possible is set as the objective function.

In practice, considering a relationship with requirements other than a noise performance, for example, a range in which shapes or phases of partial patterns can be modified is imposed as a design constraint, and is used as the constraint condition (i.e., prerequisite for optimization).

The constraint conditions and objective functions exemplified above may be used in any other combination.

In step S8 of FIG. 6, the processing device 1 may compare a variation level in the frequency domain with a threshold, in accordance with a desired frequency in which noise is to be reduced. In this case, the processing device 1 converts the total variation amount of the entire generated tread pattern into the frequency domain, using Fast Fourier Transform or the like. Further, the processing device 1 determines whether or not the variation level in at least one predetermined frequency band is lower than a predetermined threshold.

Thus, by optimizing the shapes of the partial patterns in accordance with a desired frequency, and/or, by optimizing the phases of the partial patterns in accordance with a desired frequency, it is possible to generate an optimized tread pattern in accordance with a desired frequency band.

FIG. 15 is a flowchart showing a modified embodiment of the tread pattern generation process executed by the processing device 1 of FIG. 1. In the process of FIG. 15, the processing device 1 executes step S6A, in place of step S6 of FIG. 6. In step S6A, the processing device 1 multiplies weight coefficients to the characteristic values of the partial patterns W1 to W4, and relatively moves the partial patterns W1 to W4 along the circumferential direction of the tire, so as to reduce a total variation amount of the characteristic values of at least two mutually adjacent partial patterns, as compared with the total variation amount before movement. That is, the processing device 1 weights the characteristic values of at least two mutually adjacent partial patterns to calculate the total variation amount. It is considered that noise produced in the partial pattern outside the tire is more likely to reach, for example, the observer 51 shown in FIG. 4, than noise produced in the partial pattern inside the tire. Therefore, the total variation amount may be calculated by weighting the partial pattern outside the tire using a weight coefficient larger than that of the partial pattern inside the tire. Thus, by weighting the characteristic values of the partial patterns to calculate the total variation amount, it is possible to reduce noise produced by the tire with high precision.

The tread pattern generation method and program described above can be applied to any tire having a tread pattern, for example, a pneumatic tire, a non-pneumatic tire, and a resin tire.

What is claimed is:

1. A tread pattern generation method comprising steps of:
    reading an initial tread pattern and a contact region from a storage device, the contact region indicating a region in which the tire contacts a road surface;
    dividing the initial tread pattern into a plurality of partial patterns in a width direction of the tire;
    calculating variation amounts of characteristic values of the partial patterns with respect to a circumferential direction of the tire, based on the contact region, each of the characteristic values indicating a shape of a corresponding partial pattern;
    modifying the shapes of the partial patterns so as to reduce the variation amounts of the characteristic values of the partial patterns, as compared with the variation amounts before modification;
    calculating a total variation amount of weighted characteristic values of the at least two mutually adjacent partial patterns to relatively move the partial patterns along the circumferential direction of the tire so as to reduce a total variation amount of characteristic values of at least two mutually adjacent partial patterns, as compared with the total variation amount before movement;
    combining the partial patterns with each other to generate a simulated tread pattern of the tire; and
    applying the simulated tread pattern to obtain a tire having the simulated tread pattern.

2. The tread pattern generation method as claimed in claim 1,
    wherein the step of dividing the initial tread pattern into the plurality of partial patterns includes dividing the initial tread pattern into a variable number of partial patterns in accordance with a frequency of interest.

3. The tread pattern generation method as claimed in claim 1,
    wherein the characteristic value of each one of the partial patterns includes at least one of:
    an area of a region in which the tire contacts the road surface;
    an area of a region in which the tire does not contact the road surface; and
    a volume of a space surrounded by the road surface and grooves of the tire,
    in a region in which the one of the partial patterns overlaps with a predetermined portion of the contact region.

4. The tread pattern generation method as claimed in claim 3,
    wherein the predetermined portion of the contact region includes at least one of a front edge with its neighboring region, and a rear edge with its neighboring region, with respect to a traveling direction of the tire, in a region in which the tire contacts the road surface.

5. The tread pattern generation method as claimed in claim 1,
    wherein the step of modifying the shapes of the partial patterns includes modifying the shapes of the partial patterns so as to reduce a magnitude of noise produced by the partial patterns to below a predetermined threshold in at least one predetermined frequency band.

6. The tread pattern generation method as claimed in claim 1,
    wherein the step of relatively moving the partial patterns along the circumferential direction of the tire includes relatively moving the partial patterns along the circumferential direction of the tire so as to reduce a magnitude of noise produced by the at least two mutually adjacent partial patterns to below a predetermined threshold in at least one predetermined frequency band.

* * * * *